US012578357B2

(12) United States Patent
Wilson et al.

(10) Patent No.: US 12,578,357 B2
(45) Date of Patent: Mar. 17, 2026

(54) MEMBRANE-BASED OPTOMECHANICAL ACCELEROMETER, METHODS OF MAKING THE SAME AND SYSTEMS USING THE SAME

(71) Applicant: Arizona Board of Regents, Tucson, AZ (US)

(72) Inventors: Dalziel Wilson, Tucson, AZ (US); Aman Rajendra Agrawal, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 289 days.

(21) Appl. No.: 18/277,196

(22) PCT Filed: Feb. 11, 2022

(86) PCT No.: PCT/US2022/016227
§ 371 (c)(1),
(2) Date: Aug. 14, 2023

(87) PCT Pub. No.: WO2022/174112
PCT Pub. Date: Aug. 18, 2022

(65) Prior Publication Data
US 2024/0133914 A1      Apr. 25, 2024

Related U.S. Application Data

(60) Provisional application No. 63/149,107, filed on Feb. 12, 2021.

(51) Int. Cl.
*G01P 15/093* (2006.01)

(52) U.S. Cl.
CPC .................................. *G01P 15/093* (2013.01)

(58) Field of Classification Search
CPC ............................... G01P 15/093; G01H 9/00
See application file for complete search history.

(56) References Cited

U.S. PATENT DOCUMENTS

| | | |
|---|---|---|
| 2003/0235272 A1 | 12/2003 | Appleby et al. |
| 2008/0180890 A1 | 7/2008 | Bolis |
| 2010/0275675 A1 | 11/2010 | Seppa et al. |
| 2015/0020590 A1 | 1/2015 | Painter et al. |
| 2015/0323466 A1 | 11/2015 | Pruessner et al. |
| 2019/0072428 A1 | 3/2019 | Fiore et al. |

(Continued)

OTHER PUBLICATIONS ("Systematic design of high-Q prestressed micro membrane resonators" by Gao et al. (Year: 2020).*

(Continued)

*Primary Examiner* — Xin Y Zhong
(74) *Attorney, Agent, or Firm* — Grossman, Tucker, Perreault & Pfleger, PLLC; Edmund P. Pfleger

(57) ABSTRACT

The present disclosure provides an optomechanical accelerometer that includes a first membrane having a first susceptibility; a second membrane having a second susceptibility that is greater than the first susceptibility; and at least one support member; wherein: the second membrane is supported above the first membrane by the at least one support member, such that the first and second membranes form at least a portion of an optical cavity.

18 Claims, 3 Drawing Sheets

(56)　　　　　　　References Cited

U.S. PATENT DOCUMENTS

2019/0257853　A1　　8/2019　Challener et al.
2020/0295527　A1　　9/2020　Zomer et al.

OTHER PUBLICATIONS

"Integrated Optomechanical Arrays of Two High Reflectivity SiN Membranes" by Gartner et al. (Year: 2018).*
International Search Report and Written Opinion from corresponding PCT Appln. No. PCT/US2022/016227, dated May 26, 2022. 9 pages.
International Preliminary Report on Patentability from corresponding PCT Appln. No. PCT/US2022/016227, dated Aug. 15, 2023. 7 pages.
Agrawal, et al., Summary "Membrane-Based Optomechanical Accelerometry", Tuscon, AZ, 2020, 2 pages.

* cited by examiner

MEMBRANE-BASED OPTOMECHANICAL ACCELEROMETER, METHODS OF MAKING THE SAME AND SYSTEMS USING THE SAME

CROSS REFERENCE TO RELATED APPLICATIONS

This application is a U.S. National Stage filing of PCT/US22/16227, filed Feb. 11, 2022, and claims priority to U.S. Provisional Application 63/149,107 filed Feb. 12, 2021, which are incorporated herein by reference in their entirety.

TECHNICAL FIELD

The present disclosure relates to optomechanical accelerometers, methods of making the same, and systems using the same. In particular, the present disclosure relates to membrane-based optomechanical accelerometers, methods of making the same, and systems using the same.

BACKGROUND

Accelerometers are generally configured to infer acceleration of a test mass by measuring the displacement of the test mass relative to a fixed local reference. For example, micro-electromechanical (MEMS) accelerometers may utilize a test mass that is capacitively coupled to an LC (inductor capacitor) circuit. In such accelerometers the displacement of the test mass is detected by a change in capacitance, which in turn can be used to infer acceleration.

Optomechanical accelerometers have been investigated due to their potential to exhibit higher sensitivity to acceleration than MEMS accelerometers. Numerous types of optomechanical accelerometers have been developed based on photonic crystals, whispering gallery modes/waves, and Fabry-Pérot cavities that are coupled to tethered or levitated test masses. Although such devices have shown promise, new and improved platforms that can meet certain technical demands of optomechanical accelerometers remain of interest.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Optomechanical accelerometers generally employ a mechanical resonator as a test mass and an optical cavity for displacement-based readout. While optomechanical accelerometers can have numerous advantages over electromechanical approaches such as MEMS accelerometers (including quantum-noise limited readout, high bandwidth, and radiation-pressure actuation), technical and engineering challenges have made optomechanical accelerometers impracticable for various applications, such as the ability to monolithically integrate a relatively large and compliant test mass with an optical microcavity raises significant design and manufacturing challenges.

The present disclosure is generally directed to an integrated and scalable platform enabling acceleration sensing sub-micro-$g_0$ ($g_0$=9.81 meters per second-squared) sensitivity at acoustic frequencies, based on a pair of vertically integrated membranes with different susceptibilities/stiffnesses forming an optical cavity. The optomechanical accelerometers described herein include at least a first membrane with a first susceptibility/stiffness and a second membrane with a second susceptibility/stiffness that differs from the first susceptibility/stiffness. The first and second membranes may be vertically integrated and form all or a part of a monolithic optical cavity, e.g., for light emitted by a light source.

In embodiments, the first and second membranes are formed from or include silicon nitride (e.g., $Si_3N_4$), and can achieve a mechanical quality factor Q that is greater than or equal to 1 million, 10 million, 100 million, or even 1 billion. The resonance frequencies and motion of the membranes may be tuned using radiation pressure, thermal, and electrostatic forces. The first and second membranes may also function as mirrors, together forming a Fabry-Pérot optical cavity. The membranes may be made highly reflective by employing photonic crystal patterning. The optomechanical accelerometers may also exhibit desirable Q versus mass scaling due to dissipation dilution. That is, the Q of the membranes may increase with their area, enabling large Q×m factors (Q times mass), yielding low thermal acceleration in relatively compact form factor. The membranes may be positioned within a cavity of a substrate, such as a silicon substrate. In embodiments, the silicon substrate and the membranes are integral with or coupled with one another to form a monolithic optical cavity, such as but not limited to an etalon.

Figure 1:
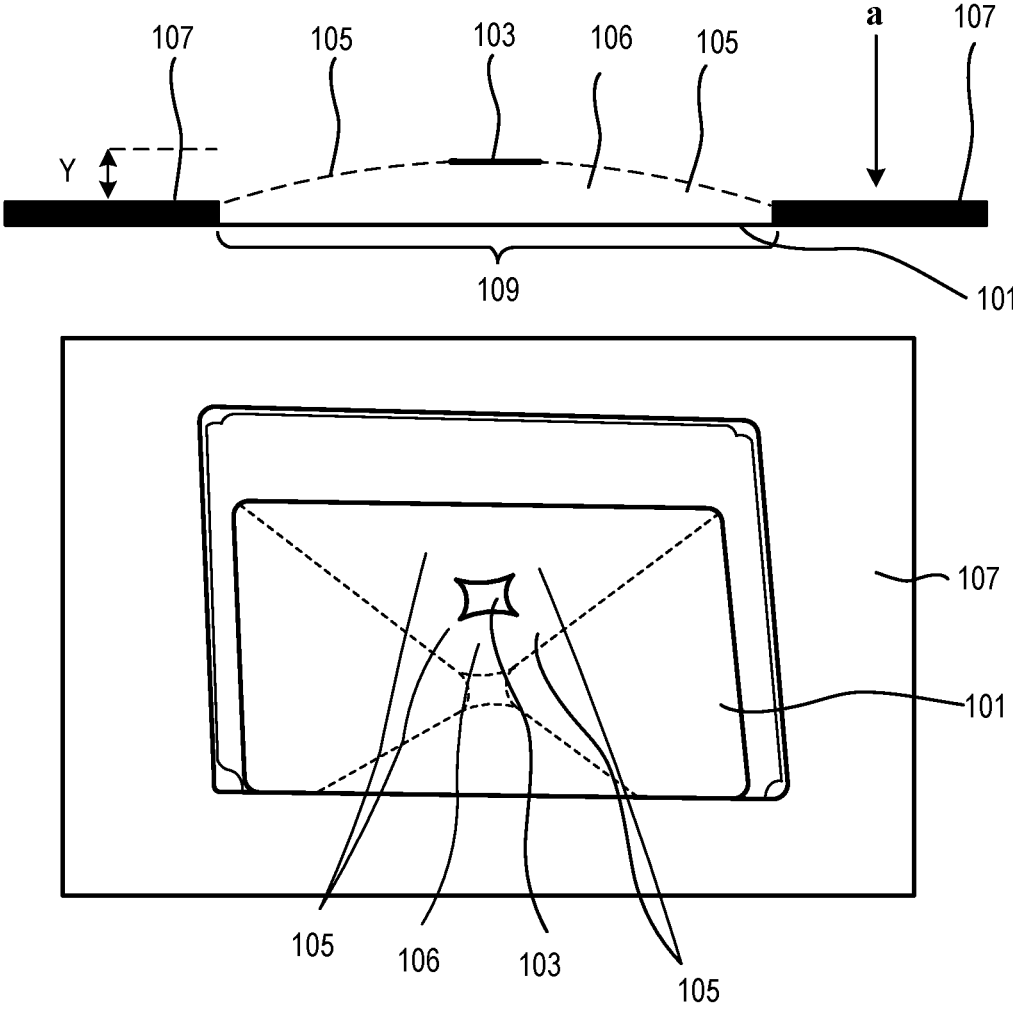
FIG. 1 depicts schematic and perspective views of one example of an optomechanical accelerometer consistent with the present disclosure.

FIG. 1. 1 depicts schematic and perspective views of one example of an optomechanical accelerometer consistent with the present disclosure. As shown, accelerometer 100 includes a first membrane 101 and a second membrane 103. The second membrane 103 is supported or suspended over one side (e.g., an upper side) of first membrane 101 by one or more supports 105. Together, the first and second membrane 101, 103 form all or a portion of an optical cavity, such as a monolithic optical cavity.

The first membrane 101 has a first susceptibility $\chi 1$ and the second membrane 103 has a second susceptibility $\chi 2$ that differs from $\chi 1$. That is, $\chi 2$ may be greater than $\chi 1$ or less than $\chi 1$. Without limitation, in embodiments $\chi 2$ is greater than $\chi 1$.

The number of supports 105 is not limited, and any suitable number of supports may be used. For example, accelerometer 100 may include one, two, three, four, five, six, seven, eight, nine, ten, or more supports. In general, supports 105 are configured to position second membrane 103 above the surface of first membrane 101, while allowing second membrane 103 to move, creating a change in the displacement of membrane 103 relative to membrane 101 in response to an applied acceleration in response to an applied acceleration. Without limitation in embodiments accelerometer 100 includes 2 or 4 supports.

As further shown in FIG. 1, accelerometer 100 may include a substrate 107. Substrate 107 may be formed from or include any suitable materials, such as silicon, fused silica, or the like. Without limitation, in embodiments substrate 107 is formed from or includes silicon. In any case, the thickness of substrate 107 is not limited and substrate 107 may have any suitable thickness. For example, substrate 107 may have a thickness in the range of 100 μm to about 500 microns (μm), such as from about 100 to about 250 μm, or even about 150 to about 250 μm. In embodiments, substrate 107 is a silicon substrate and has a thickness of about 200 μm.

Substrate 107 may include a cavity 109 formed therein. In embodiments the cavity 109 is configured such that at least first membrane 101 (and optionally second membrane 103) can be disposed therein. In that regard, in embodiments the cavity 109 has a shape that is complementary to the shape of first membrane 101. In any case, cavity 109 may include at least one sidewall. In such instances first membrane 101 may be integral with, affixed with or coupled to the at least one sidewall, as generally shown in the schematic view shown in FIG. 1. Likewise, one or more of supports 105 may be integral with or coupled to substrate 107, e.g., to a sidewall of a cavity thereof or to a surface (e.g., an upper surface) thereof. In such instances, cavity 109, first membrane 101, and second membrane 103 may form all or a part of a monolithic optical cavity, such as but not limited to an etalon. In such instances the mechanical Q factor of the optical cavity may be within the above noted ranges.

The dual-membrane cavity may be a common-path interferometer that enables direct detection measurements of the displacement signal. Since the dual-membrane cavity itself is an interferometer, a coupled probe can be detected in transmission without using an external interferometer. Without introducing additional noise source, cavity allows near-minimal shot noise (corresponding to near-maximal detection sensitivity bandwidth) and advances the integration and miniaturization.

Acceleration resolution of optomechanical accelerometers is limited by thermal fluctuation of the test mass. For a simple harmonic oscillator, the acceleration ($a_{th}$) corresponding to the force $F_{th}$ due to thermal fluctuation of the test mass m is given by equation (1) below, in which m is the test mass, Q is the quality factor, T is the temperature of the test matt, $k_B$ is the Boltzmann constant, and $\omega_0$ is the natural frequency of the oscillator (in angular units). The acceleration is frequency dependent, such as aka sinusoidal vibrations. Accordingly, it can be seen that a high mQ value support high acceleration sensitivity.

$$a_{th} = \frac{F_{th}}{m} = \sqrt{\frac{4k_B T \omega_0}{mQ}} \qquad (1)$$

Any suitable materials may be used as or in first membrane 101 and second membrane 103. Tensile-stressed silicon nitride membranes possess ultra-high mechanical quality Q due to dissipation dilution, and the quality factor Q increases with the aspect ratio (ratio of surface area to thickness of the test mass). In embodiments, first and second membranes 101, 103 each include or are formed of a silicon containing material, such as but not limited to a silicon nitride. Without limitation, in embodiments first membrane 101 and second membrane 103 are each formed from $Si_3N_4$ and achieve a quality factor Q that is greater than or equal to 1 million, 10 million, 100 million. Engineering phononic structures on the test mass may yield Q up to 1 billion.

The thickness of the first and second membranes 101, 103 is not limited, and such membranes may have any suitable thickness. Without limitation, first and second membranes 101, 103 each have a thickness that is less than 500 nanometer (nm), such as less than 250 nm, or even less than 200 nm. Without limitation in embodiments first and second membranes 101, 103 each have a thickness that is less than 100 nm. The thickness (T1) of first membrane 101 may be the same or different from the thickness (T2) of second membrane 103. In embodiments, T1 and T2 have the same or about the same thickness (+/–5%), e.g., about 100 nm.

In addition, nanomechanical $Si_3N_4$ membrane of ~100 nm thickness is reflective at commonly used detection wavelengths, e.g., 850 nm. The reflectivity could be enhanced to 99% by photonic-crystal patterning, allowing the mechanically compliant membrane to simultaneously serve as end-minors of high-finesse optical cavities.

The dimensions of first membrane 101 and second membrane 103 are not limited. In embodiments and as shown in FIG. 1, second membrane 103 has an area that is smaller than that of first membrane 101. In embodiments second membrane 103 is in the form of a millimeter scale $Si_3N_4$ trampoline that is monolithically suspended above first membrane 101. For example, first membrane 101 may have a width of about 2.5 millimeters (mm) and second membrane 103 may have a width of about 1 mm.

Increasing area and thickness of the test mass increases the mass m. However, as discussed above, the quality factor Q increases with the aspect ratio which is ratio of surface area to thickness of the test mass. The increasing of thickness (e.g., more than ~200 nm) may bring unfavorable optical properties.

The shape of first membrane 101 and second membrane 103 is not limited. In embodiments first membrane 101 has a first shape and second membrane 103 has a second shape, wherein the second shape is the similar to or different from the first shape. For example, first membrane 101 may have a geometric (e.g., circular, ellipsoidal, triangular, quadrilateral, pentagonal, etc.) or irregular shape. In such instances, second membrane 103 may have the same or different shape as first membrane 101, but may be physically smaller than first membrane 101. This may be reflected by the relative mass of first and second membranes 101, 103. For example, first membrane 101 may have a mass (m1) of about 1-3 micrograms, whereas second membrane 103 may have a mass (m2) of about 10 to 30 nanograms. Put differently, the mass m1 of first membrane 101 may be 10 to 1000 (e.g., 100 to 1000) times greater than the mass m2 of the second membrane 103. Without limitation, in embodiments the mass m1 is about 1 microgram, and the mass m2 is about 10 nanograms.

A displacement of a membrane is determined by its susceptibility and accelerations, as given by equation (2) below, in which x is the displacement of a membrane, $\chi$ is the susceptibility of a membrane, and a is an acceleration. Susceptibility is inverse in sense to stiffness. When the first membrane and the second membrane have different susceptibilities, the same acceleration may cause relative displacement between the first membrane and second membrane.

$$x(\omega) = a(\omega)\chi(\omega) \qquad (2)$$

The susceptibility $\chi$ of a membrane, which is a function of frequency $\omega$, is determined by its natural frequency $\omega_0$

5 and quality factor Q, as given by equation (3) below. The quality factor Q depends on the area and thickness of the membrane.

$$\chi(\omega) = \frac{1}{\left(\omega_0^2 - \omega^2\right) + i\omega_0\omega/Q} \tag{3}$$

The displacements could be read out by the dual-membrane cavity itself as an interferometer. However, the read-out sensitivity $x_{shot}$ is limited by shot noise of the interferometric light. Shot noise is decreased at higher optical power. The dual-membrane cavity amplifies effective incident power $P_{in}$ by optical finesse $\mathcal{F}$. The shot noise by optical finesse $\mathcal{F}$ is given in equation (4) below. The finesse of an optical resonator/cavity is a measure for how narrow the optical resonances are in relation to their frequency distance: a high finesse means sharp optical resonances.

$$x_{shot}(\omega) \propto \frac{1}{\mathcal{F}\sqrt{P_{in}}} \tag{4}$$

$\mathcal{F}$ is increased by increasing the reflectivity R of the membranes. Assuming both membranes have the same R and R>0.5, $\mathcal{F}$ could be given by $$\mathcal{F} \approx \frac{\pi\sqrt{R}}{1-R}.$$

depends on the thickness, wavelength, and geometry of the membrane. The first and second membranes may also be able to function as a high reflectivity mirror, e.g., by employing photonic crystal patterning, such as employing nanoscale holes patterned onto the membranes. Photonic Crystal patterning may increase R to >99% ($\mathcal{F}$ >100). A broadband thermal sensitivity for 250 βW of near-infrared (850 nm) optical power may be achieved by increasing the finesse to $\mathcal{F} \approx 100$.

In one embodiment, the first membrane 101 and second membrane 103 are both $Si_3N_4$ provided on opposite sides of a Si Chip 107. The second membrane 103 monolithically suspended above the first membrane 101 is a millimeter-scale $Si_3N_4$ trampoline. The dual-membrane cavity is provided in the environment with room temperature of 300 K. The second membrane 103 has a quadrilateral shape with the side length of 0.2 mm and the thickness of 75 nm, with a quality factor Q of 11 million. The second membrane 103 has a mass of about 12 ng, and natural frequency $\omega_0$ of $2\pi\times40$ kHz. The first membrane 101 has a quadrilateral shape with a mass of greater than 1 μg, and natural frequency $\omega_0$ of greater than $2\pi\times180$ kHz. As noted above first and second membranes 101, 103 form all or a part of an optical cavity, in which case the first and second membranes 101, 103 are in the form of a mechanical resonator or oscillator. In this embodiment, the first membrane 101 is relatively rigid, with the susceptibility $\chi_2$ of the second membrane 103 much greater than the susceptibility $\chi_1$ of the first membrane 101 ($\chi_2 >> \chi_1$). The motion of the first membrane 101 can be ignored. As such, the susceptibility $\chi$ of the entire system is approximately equal as the second membrane 103's susceptibility $\chi_2$, given by the resonance frequency $\omega_0$ and quality factor Q of the second membrane. Such that, the natural frequency $\omega_0$ of the entire system is $2\pi\times40$ kHz. The

6 displacement can be read out by monitoring the resonance frequency of the etalon formed by the membranes, yielding an acceleration sensitivity by thermal motion of the trampoline $a_{th}$ to about 600 nano-$g_0/\sqrt{Hz}$($g_0$9.81 m/s²).

Take the first membrane 101 has a quadrilateral shape with a mass of about 1 μg and natural frequency $\omega_0$ of $2\pi\times180$ kHz for example, at a frequency of $2\pi\times40$ kHz, the first membrane 101 has a susceptibility of $8.5\times10^{-13}S^2$ and the second membrane has a susceptibility of $1.7\times10^4S^2$. ($S^2$ is second²). The susceptibility $\chi_2$ of the second membrane 103 much greater than the susceptibility $\chi_1$ of the first membrane 101 and the natural frequency $\omega_0$ of the entire system is $2\pi\times40$ kHz.

The motion is imprinted onto the phase of the intracavity light field, thereby leading to changes in the transmitted amplitude. This interferometric aspect of the optical cavity implies that the resulting power fluctuations can be directly measured by a photodetector to infer the displacement of the test mass (as an alternative to optical homodyne detection, which is sensitive to phase differentials as opposed to amplitude fluctuations of the transmitted light). In this direct detection scheme, the displacement is maximally transduced to a transmittance change for probe wavelengths such as 849.7 nm that ensure "side of the fringe" operation.

Figure 2A:
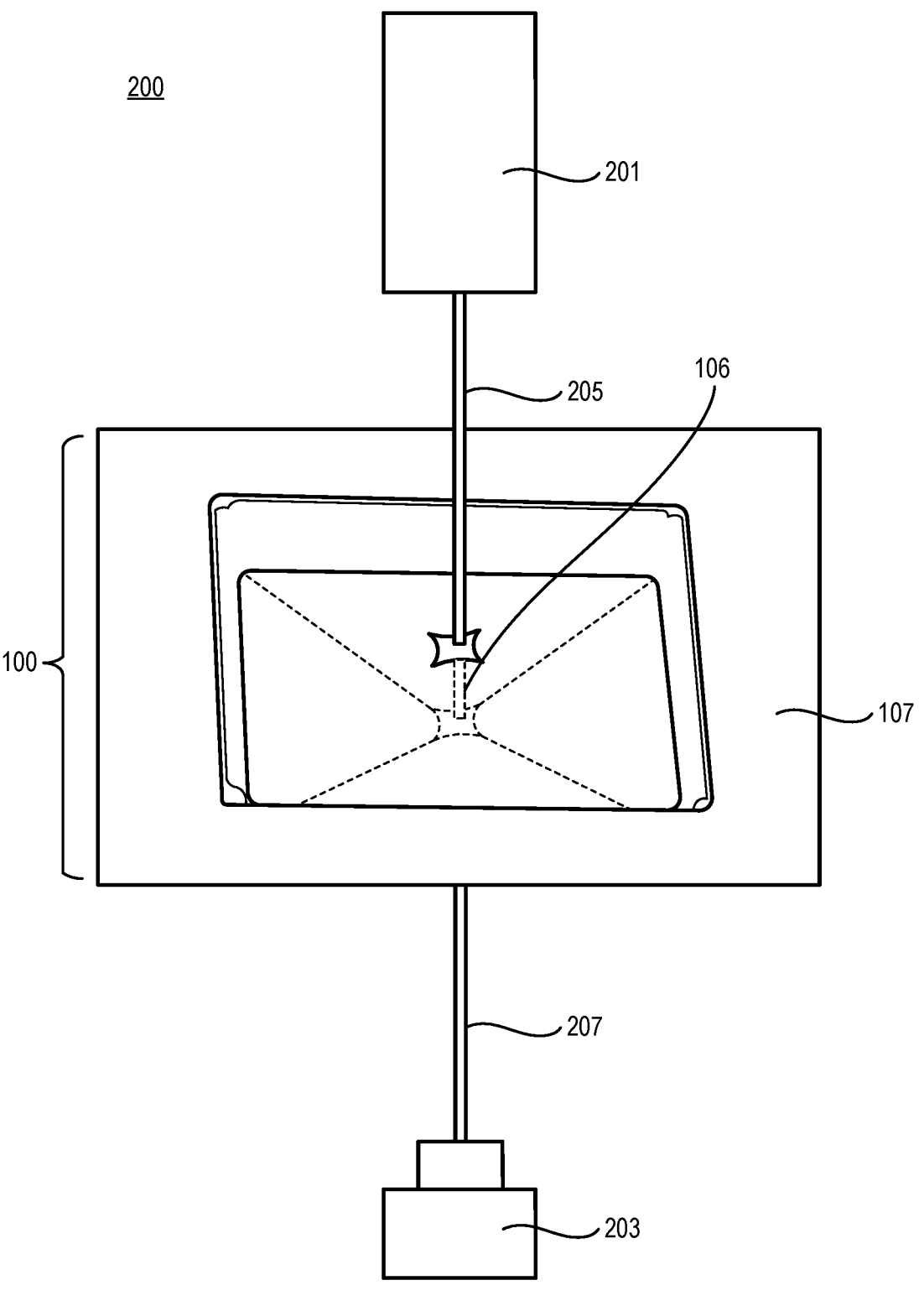
FIG. 2A depicts one example of a system including an optomechanical accelerometer consistent with the present disclosure.
Figure 2B:
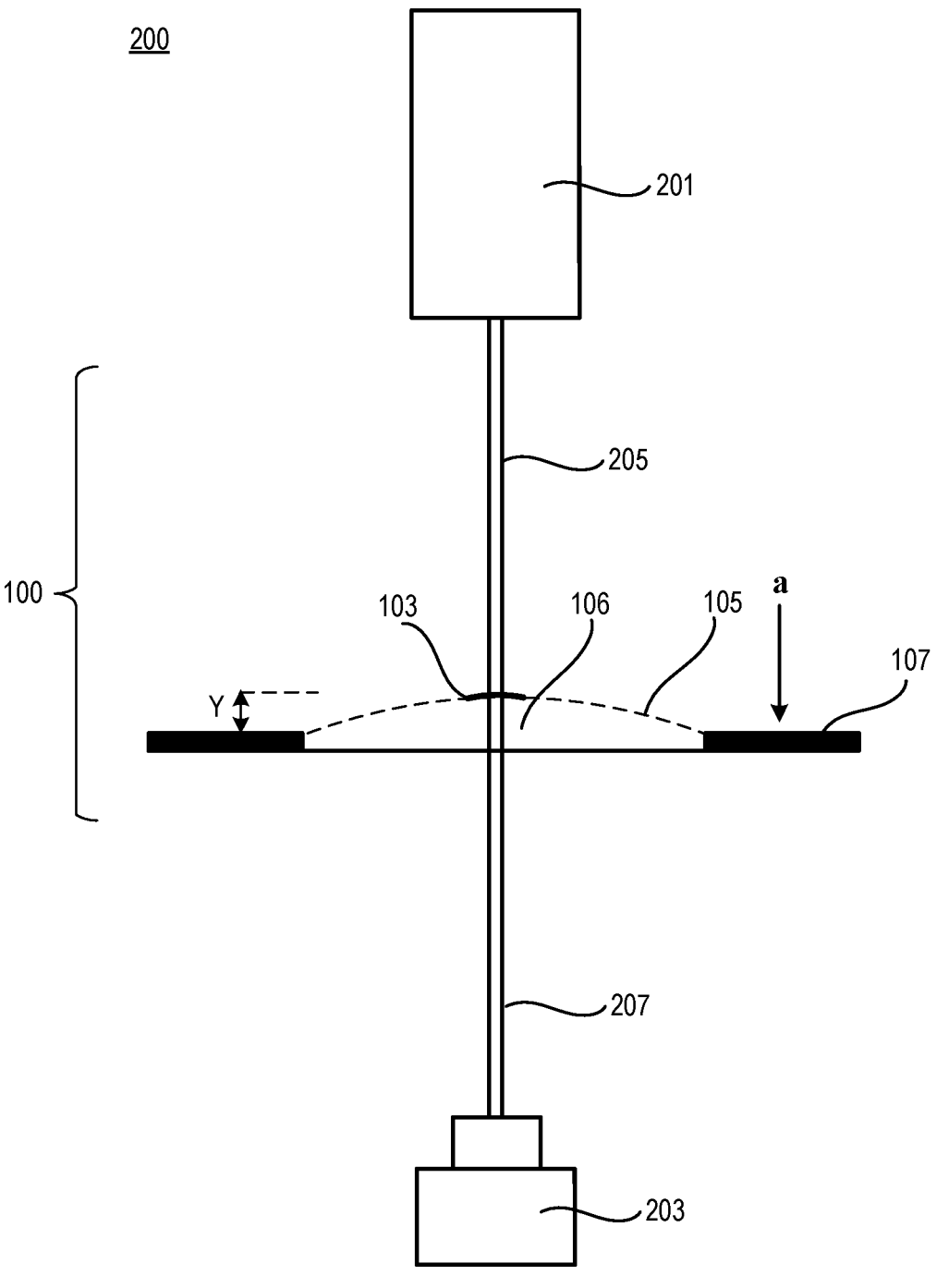
FIG. 2B is a block diagram of the system of FIG. 2A, with the optomechanical accelerometer shown in a schematic form.

Another aspect of the present disclosure relates to systems for measuring acceleration with an optomechanical accelerometer. In that regard reference is made to FIGS. 2A and 2B, which depict schematic and block diagrams, respectively, of one example of a system for measuring acceleration consistent with the present disclosure. As shown, system 200 includes an optomechanical accelerometer 100 between a light source 201 and a photodetector 203. Light source 201 (e.g., a laser or other suitable light source) emits input light 205 onto optomechanical accelerometer 100 and, more particularly, onto a surface of second membrane 103. When an acceleration is applied to substrate 101, second membrane 103 is displaced relative to first membrane 101, resulting in a corresponding change in the resonant frequency of optomechanical accelerometer 100, which is detectable by measuring output light 207 passing through optomechanical accelerometer 100 with photodetector 203.

Another aspect of the present disclosure relates to methods of forming an optomechanical accelerometers. In embodiments, the methods include forming a first membrane within a cavity of a substrate, wherein the first member has a first susceptibility $\chi_1$. The method may further include forming a second membrane with a second susceptibility $\chi_2$ that is different from (e.g., greater than) susceptibility $\chi_1$, wherein the second membrane is supported above the first membrane by at least one support member such that the first and second membranes form at least part of an optical cavity, such as but not limited to an etalon. The materials and construction of the first membrane, second membrane, and the substrate are the same as described above and so are not reiterated in the interest of brevity. In embodiments, the first and second membranes are both $Si_3N_4$ and the substrate is a silicon substrate. In any case, forming the first and second membranes may include etching (e.g., by chemical etching) a membrane material at least partially disposed within the cavity in the substrate. The cavity in the substrate may be formed in any suitable manner, such as by providing a substrate and etching (e.g., chemically) the cavity into the substrate.

In one embodiment, the dual-membrane cavity, working as a Fabry-Pérot cavity, makes sensitive displacement measurements without external interferometer. The probe is a laser beam (e.g., an 850 nm beam) from a light source (e.g., External Cavity Diode Laser, ECDL) at normal incidence to the dual-membrane device, sent directly to a silicon photodetector (e.g., Thorlabs PDA36A2) after transmission through the accelerometer. The wavelength was scanned from 848 nm to 852 nm in steps of 0.1 nm to obtain the transmission fringes. A free spectral range (FSR) is 1.78 nm (consistent with the design membrane-separation of 210 μm), and optical finesse is 2.23. The low finesse is in line with expectations from silicon nitride membranes of 75 nm thickness without reflectivity-enhancement from photonic crystal (PtC) patterning. A higher finesse cavity is desirable as it decreases shot noise by a factor of $\mathcal{F}$ by amplifying the effective probe power. In alternative, the effect of low finesse could be overcome by increasing the laser power; operating at the side of the fringe (to maximize displacement-to-photovoltage sensitivity in transmission), even a few milliwatts of probe power (which is insufficient to affect the sensor photothermally) can suppress the shot noise from the low-finesse device to $\leq$fm/$\sqrt{\text{Hz}}$ at the typical level of intensity noise from ECDL lasers. Using the slope at the maximum sensitivity point, only ~mW incident probe power is needed for achieving 1 fm/$\sqrt{\text{Hz}}$ shot noise sensitivity, assuming close to 100% detection efficiency.

Converting the photocurrent recorded as a voltage by the photodetector to displacement units is an important step in the method, wherein different ways are employed, such as "temperature standard candle", "wavelength ruler", or "reference membrane".

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "about" when used in connection with a value or a range means +/–5% of the indicated value or endpoints of the indicated range.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An optomechanical accelerometer, comprising:
a substrate having an optical cavity defined therein;
a first membrane having a first susceptibility;
a second membrane having a second susceptibility that is greater than the first susceptibility; and wherein the mass of the first membrane is between 10 to 1000 times greater, inclusive, of the mass of the second membrane; and wherein the second membrane has an area that is smaller than an area of the first membrane; and
at least one support member;

wherein:
the second membrane is supported above the first membrane by the at least one support member, such that the first and second membranes form at least a portion of the optical cavity; wherein acceleration of the substrate is determined by relative displacement of the first and second membranes.

2. The optomechanical accelerometer of claim 1, wherein the first and second membranes are each formed from Si3N4.

3. The optomechanical accelerometer of claim 1, wherein the first and second membranes each have a thickness less than or equal to 100 nm.

4. The optomechanical accelerometer of claim 1, wherein the substrate is a silicon substrate.

5. The optomechanical accelerometer of claim 1, wherein the optical cavity is an etalon.

6. A method of forming an optomechanical accelerometer, comprising:
forming a first membrane within a cavity of a substrate, the first membrane having a first susceptibility; and
forming a second membrane having a second susceptibility that is greater than the first susceptibility, wherein the second membrane is supported above the first membrane by at least one support member such that the first and second membranes form at least a portion of an optical cavity; and wherein the mass of the first membrane is between 10 to 1000 times greater, inclusive, of the mass of the second membrane; and wherein the second membrane has an area that is smaller than an area of the first membrane; wherein acceleration of the substrate is determined by relative displacement of the first and second membranes.

7. The method of claim 6, wherein the first and second membranes are each formed from Si3N4.

8. The method of claim 6, wherein the first and second membranes each have a thickness less than or equal to 100 nm.

9. The method of claim 6, wherein the substrate is a silicon substrate.

10. The method of claim 6, wherein the optical cavity is an etalon.

11. The method of claim 6, wherein forming the first membrane comprises etching a membrane material at least partially disposed within the cavity.

12. The method of claim 11, wherein forming the second membrane comprises etching the membrane material.

13. A system for measuring acceleration, comprising:
a light source configured to produce light;
a photodetector configured to detect light produced by the light source; and
an optomechanical accelerometer between the light source and the photodetector;
wherein:
the optomechanical accelerometer comprises:
a substrate having an optical cavity defined therein;
a first membrane having a first susceptibility;
a second membrane having a second susceptibility that is greater than the first susceptibility; and wherein the mass of the first membrane is between 10 to 1000 times greater, inclusive, of the mass of the second membrane; and wherein the second membrane has an area that is smaller than an area of the first membrane; and
at least one support member;

wherein:

the second membrane is supported above the first membrane by the at least one support member, such that the first and second membranes form at least a portion of the optical cavity; wherein acceleration of the substrate is determined by relative displacement of the first and second membranes.

14. The system of claim 13, wherein the first and second membranes are each formed from Si3N4.

15. The system of claim 13, wherein at least one of the first membrane and the second membrane comprises photonic-crystal patterning.

16. The system of claim 13, wherein the first and second membranes each have a thickness less than or equal to 100 nm.

17. The system of claim 13, wherein both the first and second membranes have a quadrilateral shape.

18. The system of claim 13, wherein the first membrane has a mass greater than 1 μg and natural frequency $\omega\_0$ of $2\pi \times 180$ kHz, and the second membrane has a mass of about 12 ng, and natural frequency $\omega\_0$ of $2\pi \times 40$ KHz.

\* \* \* \* \*